(12) United States Patent
Shimada

(10) Patent No.: US 9,128,275 B2
(45) Date of Patent: Sep. 8, 2015

(54) VARIABLE MAGNIFICATION OPTICAL SYSTEM AND IMAGING APPARATUS

(71) Applicant: FUJIFILM CORPORATION, Tokyo (JP)

(72) Inventor: Yasutaka Shimada, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/513,416

(22) Filed: Oct. 14, 2014

(65) Prior Publication Data

US 2015/0029597 A1 Jan. 29, 2015

Related U.S. Application Data

(63) Continuation of application No. PCT/JP2013/002559, filed on Apr. 16, 2013.

(30) Foreign Application Priority Data

Apr. 18, 2012 (JP) ................................. 2012-094604

(51) Int. Cl.
*G02B 15/14* (2006.01)
*G02B 15/177* (2006.01)
*G02B 13/00* (2006.01)

(52) U.S. Cl.
CPC ............ *G02B 15/177* (2013.01); *G02B 13/009* (2013.01)

(58) Field of Classification Search
CPC .. G02B 15/177; G02B 13/009; G02B 15/161; G02B 27/0062; G02B 9/08

USPC .......................................................... 359/692
See application file for complete search history.

(56) References Cited

U.S. PATENT DOCUMENTS

| | | | |
|---|---|---|---|
| 5,910,860 A | 6/1999 | Ozaki et al. | |
| 6,078,435 A | 6/2000 | Yoneyama | |
| 6,169,635 B1 | 1/2001 | Ozaki et al. | |
| 6,934,092 B1 | 8/2005 | Nakayama | |
| 2002/0051301 A1* | 5/2002 | Noguchi et al. | ............... 359/689 |

FOREIGN PATENT DOCUMENTS

| | | |
|---|---|---|
| JP | 10-206734 | 8/1998 |
| JP | 11-160619 | 6/1999 |

(Continued)

OTHER PUBLICATIONS

International Search Report—PCT/JP2013/002559—Aug. 20, 2013.

*Primary Examiner* — Alicia M Harrington
(74) *Attorney, Agent, or Firm* — Young & Thompson

(57) ABSTRACT

A variable magnification optical system includes a negative first lens group, a stop, and a positive second lens group. The distance in an optical axis direction between the first and the second lens groups is reduced when magnification is changed from the wide angle end to the telephoto end. The stop is fixed with respect to an image plane when magnification is changed, and the first lens group includes a positive lens, a negative lens, a negative lens, and a positive meniscus lens with a convex surface on the object side in order from the object side. The optical system satisfies predetermined conditional expressions with respect to the average Abbe number of the positive lens and the positive meniscus lens of the first lens group at the d-line, and the focal length of the entire system at the wide angle end and the focal length of the negative lens.

13 Claims, 13 Drawing Sheets

(56) References Cited

FOREIGN PATENT DOCUMENTS

| | | |
|---|---|---|
| JP | 11-223768 | 8/1999 |
| JP | 11-305125 | 11/1999 |
| JP | 2000-35537 | 2/2000 |
| JP | 2001-330773 | 11/2001 |
| JP | 2007-79108 | 3/2007 |

* cited by examiner

EXAMPLE 3

VARIABLE MAGNIFICATION OPTICAL SYSTEM AND IMAGING APPARATUS

CROSS-REFERENCE TO RELATED APPLICATIONS

This application is a Continuation of PCT International Application No. PCT/JP2013/002559 filed on Apr. 16, 2013, which claims priority under 35 U.S.C. §119 (a) to Japanese Patent Application No. 2012-094604 filed on Apr. 18, 2012. Each of the above application(s) is hereby expressly incorporated by reference, in its entirety, into the present application.

BACKGROUND OF THE INVENTION

1. Technical Field

The present invention relates to a variable magnification optical system and an imaging apparatus, and more specifically to a variable magnification optical system that can be used in video cameras, electronic still cameras, and particularly suitable for use as a surveillance camera application and an imaging apparatus equipped with the variable magnification optical system.

2. Background Art

As optical systems used in imaging devices, such as video cameras, electronic still cameras, surveillance cameras, and the like with image sensors such as CCD (Charge Coupled Device), CMOS (Complementary Metal Oxide Semiconductor), and the like as recording media, variable magnification optical systems for CCTV (Closed-circuit Television) have been developed. The variable magnification optical system for CCTV has an advantage that it is user friendly, for example, the focal length can be set according to the use environment, subject distance can be set on the user side, and the like. The CCTV optical system whose main purpose is surveillance needs to cover from a wide viewing area to the standard angle of view and withstand indoor and outdoor usages while being compact. For this reason, a negative-positive two-group variable magnification optical system composed of a negative first lens group and a positive second lens group which is relatively simple in configuration and satisfies these conditions is heavily used. For example, as negative-positive two-group variable magnification optical systems in which the first lens group is composed of four lenses of positive, negative, negative, and positive lenses and have a magnification ratio of about 3, those described in Japanese Unexamined Patent Publication No. 11 (1999)-160619, Japanese Unexamined Patent Publication No. 2000-035537, Japanese Unexamined Patent Publication No. 2001-330773, and Japanese Unexamined Patent Publication No. 2007-079108 are proposed.

DISCLOSURE OF THE INVENTION

Recently, as the surveillance camera market has expanded rapidly, the development competition has intensified and there is a strong need to develop a compact and low cost lens system yet satisfying high specifications, such as having a large aperture ratio so as to be used under low light imaging conditions and the like, and having high imaging performance. Further, in recent years, there has been an increasing demand for a simple and useful variable magnification optical system that allows high resolution and high magnification imaging, such as being capable of reading vehicle license plate labelling and the like, includes wide angle to telephoto areas, and assumed to be used in a range from visible to near infrared regions, as well as for general surveillance purposes.

Although having magnification ratios of about 2 to 3, those described in Japanese Unexamined Patent Publication No. 11 (1999)-160619, Japanese Unexamined Patent Publication No. 2000-035537, Japanese Unexamined Patent Publication No. 2001-330773, and Japanese Unexamined Patent Publication No. 2007-079108 are unsatisfactory as the variable magnification optical systems for surveillance cameras because they have large F-numbers.

The present invention has been developed in view of the circumstances described above, and it is an object of the present invention to provide a variable magnification optical system which is compact and low cost, ensures high optical performance, though having a large aperture ratio, and has a magnification ratio of about 3, including wide angle to telephoto regions, and an imaging apparatus equipped with the variable magnification optical system.

A variable magnification optical system of the present invention consists essentially of a first lens group having a negative refractive power, a stop, and a second lens group having a positive refractive power in order from the object side and is configured such that the distance in an optical axis direction between the first lens group and the second lens group is reduced when magnification is changed from the wide angle end to the telephoto end, wherein:

the stop is fixed with respect to an image plane when magnification is changed;

the first lens group is composed of a positive lens, a negative lens, a negative lens, and a positive meniscus lens with a convex surface on the object side in order from the object side; and the variable magnification optical system satisfies conditional expressions (1) and (2) given below:

$$22 < \nu dp < 47 \tag{1}$$

$$-5.00 < f2/fw < -1.20 \tag{2}$$

where,

νdp: average Abbe number of the most object side positive lens and the most image side positive meniscus lens in the first lens group at the d-line, fw: focal length of the entire system at the wide angle end, and f2: focal length of the negative lens disposed second from the object side in the first lens group.

The variable magnification optical system according to the present invention preferably satisfies a conditional expression (1-1) given below. Further, the variable magnification optical system preferably satisfies a conditional expression (2-1) given below.

$$24 < \nu dp < 44 \tag{1-1}$$

$$-4.00 < f2/fw < -2.00 \tag{2-1}$$

The variable magnification optical system of the present invention consists essentially of the first lens group and the second lens group, but may include a lens having substantially no refractive power, an optical element other than a lens, such as a stop, a cover glass, and the like, a lens flange, a lens barrel, an image sensor, a mechanical component, such as a camera shake correction mechanism, and the like, in addition to the lens groups.

In the present invention, the surface shapes of the lenses, such as convex surface, concave surface, planar surface, biconcave, meniscus, biconvex, planar-convex, planar-concave, and the like, and the signs of the refractive powers, such as positive and negative, are considered in the paraxial region for those which include an aspherical surface unless otherwise specifically described. Further, the sign of a radius of curvature is positive if the surface shape is convex on the object side and negative if it is convex on the image side in the present invention.

The variable magnification optical system according to the present invention preferably satisfies a conditional expression (3) given below, and more preferably satisfies a conditional expression (3-1) given below.

$$3 < f1/fw < 17 \quad (3)$$

$$6 < f1/fw < 14 \quad (3\text{-}1)$$

where,
f1: focal length of the most object side positive lens in the first lens group, and
fw: focal length of the entire system at the wide angle end.

Further, in the variable magnification optical system according to the present invention, the second lens group is composed of a biconvex lens, a negative lens, a biconvex lens, a negative lens, and a positive lens in order from the object side.

In this case, the variable magnification optical system preferably satisfies a conditional expression (4) given below, and more preferably satisfies a conditional expression (4-1) given below.

$$0.3 < f5/fG2 < 1.5 \quad (4)$$

$$0.6 < f5/fG2 < 1.2 \quad (4\text{-}1)$$

where,
f5: focal length of the most object side biconvex lens in the second lens group, and
fG2: focal length of the second lens group.

Further, the variable magnification optical system according to the present invention preferably satisfies conditional expressions (5) to (7) given below, and more preferably satisfies conditional expressions (5-1), (6-1), and (7-1) given below.

$$-0.1 < fG2F/fG2B < 0.1 \quad (5)$$

$$-5 < vd8 - vd9 < 10 \quad (6)$$

$$29 < vd9 < 37 \quad (7)$$

$$-0.05 < fG2F/fG2B < 0.05 \quad (5\text{-}1)$$

$$0 < vd8 - vd9 < 5 \quad (6\text{-}1)$$

$$31 < vd9 < 36 \quad (7\text{-}1)$$

where,
fG2F: combined focal length of the object side three lenses in the second lens group,
fG2B: combined focal length of the image side two lenses in the second lens group,
vd8: Abbe number of the second negative lens from the image side in the second lens group at the d-line,
vd9: Abbe number of the most image side positive lens in the second lens group at the d-line.

Further, in the variable magnification optical system according to the present embodiment, it is preferable that the most object side positive lens in the first lens group is composed of a positive meniscus lens with a convex surface on the object side and the variable magnification optical system satisfies a conditional expression (8) given below.

$$4 < r1f/fw < 9 \quad (8)$$

where,
r1f: radius of curvature of the object side surface of the most object side positive lens in the first lens group, and
fw: focal length of the entire system at the wide angle end.

The imaging apparatus of the present invention is equipped with the variable magnification optical system described above.

According to the present invention, a variable magnification optical system may be formed compact with low cost by arranging a first lens group having a negative refractive power, a stop, and a second lens group having a positive refractive power in order from the object side and configuring such that the distance in an optical axis direction between the first lens group and the second lens group is reduced when magnification is changed from the wide angle end to the telephoto end, in which the stop is fixed with respect to an image plane when magnification id changed, the first lens group is composed of a positive lens, a negative lens, a negative lens, and a positive meniscus lens in order from the object side, and the variable magnification optical system satisfies the conditional expressions (1) and (2). Further, a variable magnification optical system with high optical performance while having a large a large aperture ratio may be formed.

According to the imaging apparatus of the present invention, the apparatus is equipped with the variable magnification optical system of the present invention, so that the apparatus can be constructed compact with high performance and allows a favorable image to be obtained using an image sensor.

BEST MODE FOR CARRYING OUT THE INVENTION

Figure 1:
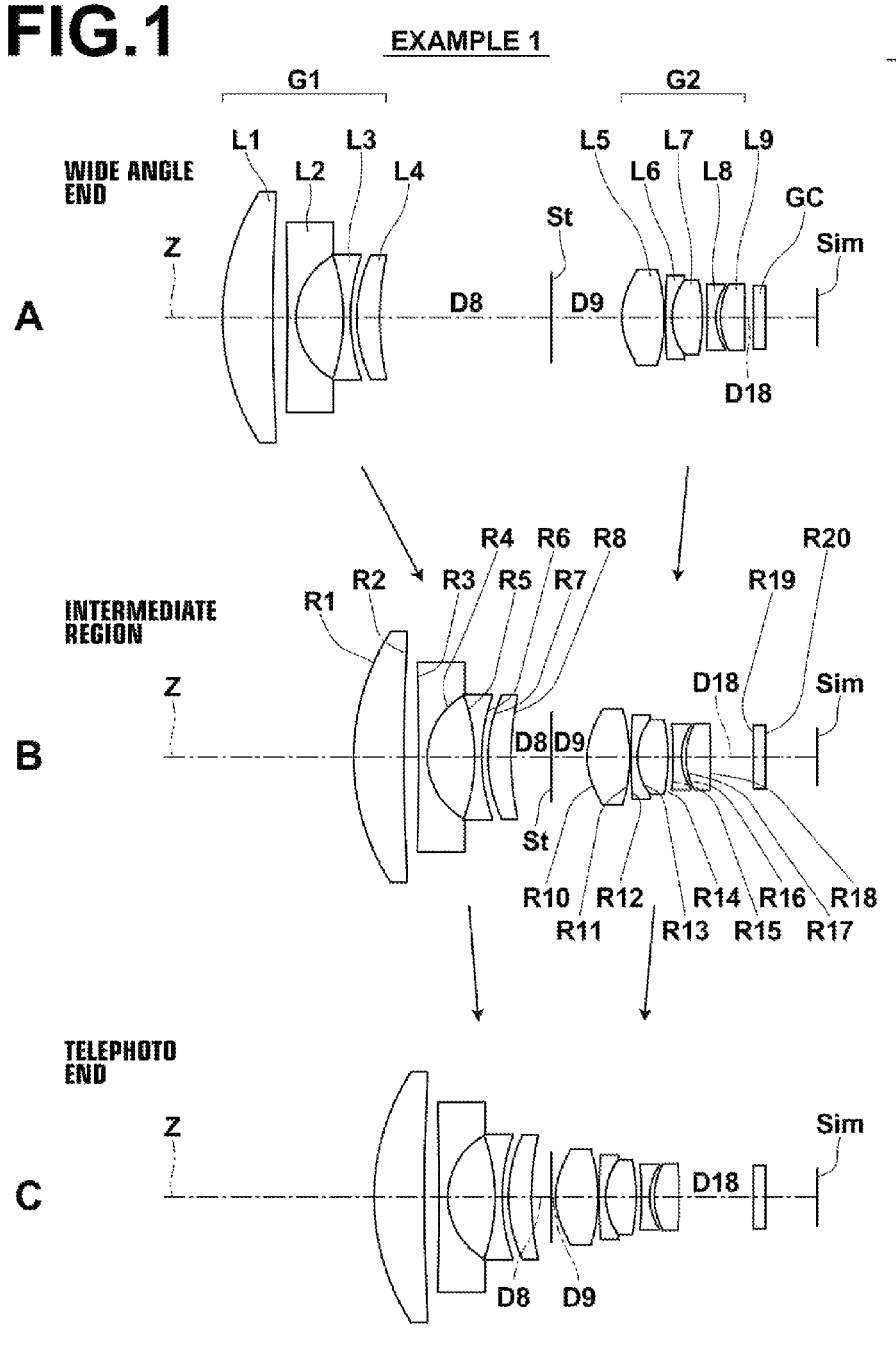
FIG. 1 is a lens cross-sectional view corresponding to Example 1, illustrating a first configuration example of the variable magnification optical system according to an embodiment of the present invention.

Hereinafter, embodiments of the present invention will be described in detail with reference to the accompanying drawings. A, B, C of FIG. 1 illustrate a first configuration example of the variable magnification optical system according to an embodiment of the present invention. This configuration example corresponds to the lens configuration of Example 1, to be described later. A of FIG. 1 corresponds to the optical system arrangement at the wide angle end (shortest focal length state), B of FIG. 1 corresponds to the optical system arrangement in the intermediate region (intermediate focal length state), and C of FIG. 1 corresponds to the optical system arrangement at the telephoto end (longest focal length state). Likewise, second and third configuration examples corresponding to lens configurations of Examples 2 and 3, to be described later, are shown in A, B, C of FIG. 2 and A, B, C of FIG. 3. In A, B, C of FIG. 1 to A, B, C of FIG. 3, the reference symbol Ri represents the radius of curvature of $i^{th}$ surface in which a number i (i=1, 2, 3, - - - ) is given to each surface in a serially increasing manner toward the image side (imaging side) with the object side surface of the most object side constituent element being taken as the first surface. The reference symbol Di represents the surface distance between $i^{th}$ surface and $(i+1)^{th}$ surface on the optical axis Z. Note that the symbol Di is given only to the surface distances that changes with a change in the imaging magnification ratio (D8, D9, D18).

The variable magnification optical system includes a first lens group G1 having a negative refractive power, an aperture stop St, and a second lens group G2 having a positive refractive power disposed along the optical axis in order from the object side, and is configured such that magnification is changed by changing the distance in an optical axis direction between the first lens group G1 and the second lens group G2. Further, in the variable magnification optical system, the aperture stop St is fixed with respect to the image plane Sim when magnification is changed. Note that the aperture stop St illustrated in FIG. 1 does not necessarily represent the size and shape but indicates the position on the optical axis Z.

When applying the variable magnification optical system to an imaging apparatus, an image sensor, such as CCD (Charge Coupled Device), CMOS (Complementary Metal Oxide Semiconductor), or the like is disposed on the image plane Sim. The image sensor outputs an imaging signal corresponding to an optical image formed by the variable magnification optical system of the present embodiment. An imaging apparatus of the present embodiment is formed by at least the variable magnification optical system and the image sensor. Preferably, a cover glass, a prism, and various types of filters, such as a low-pass filter, an infrared cut filter, and the like, are disposed between the optical system and the image plane Sim according to the structure of the imaging apparatus side on which the variable magnification optical system is mounted. FIG. 1 illustrates an example in which a parallel plate optical member GC which assumes these is disposed between the second lens group G2 and the image plane Sim.

The first lens group G1 includes four lenses of a lens L1 which is a positive lens, a lens L2 which is a negative lens, a lens L3 which is a negative lens, and a lens L4 which is a positive meniscus lens with a convex surface on the object side arranged in order from the object side.

The lenses L2 and L3 share the negative refractive power of the first lens group G1 and correct spherical aberration and off-axis coma aberration. The lens L4 corrects spherical aberration, longitudinal chromatic aberration, and lateral chromatic aberration along with the lens L1. In the role sharing with the lens L1, the lens L1 mainly takes charge of lateral chromatic aberration while the lens L4 mainly takes charge of spherical aberration and longitudinal chromatic aberration.

All the lenses in the first lens group G1 may be single lenses and this allows cost reduction. Further, the disposition of the lens L1 which is a positive lens on the most object side in the first lens group G1 allows both downsizing of the entire system and securing of favorable imaging performance to be achieved. The lens L1 preferably has a convex surface on the object side and particularly preferably has a meniscus shape with a convex surface on the object side. This allows the refractive power to be reduced by a concave surface of the lens L1 on the image side in comparison with the case in which a biconvex lens or a planar-convex lens is used as the lens L1, whereby the overall length of the variable magnification optical system may be reduced without increasing the refractive power of the lens L1.

The use of a positive meniscus lens with a convex surface on the object side as the lens L4 allows spherical aberration at the telephoto end and astigmatism on the wide angle side to be corrected satisfactorily.

The second lens group G2 includes five lenses of a lens L5 which is a biconvex lens, a lens L6 which is a negative lens, a lens L7 which is a biconvex lens, a lens L8 which is a negative lens, and a lens L9 which is a positive lens. The object side and the image side surfaces of the lens L5 are formed of aspherical surfaces.

Three positive lenses of the lens L5, the lens L7, and the lens L9 share the positive refractive power, while the two negative lenses of the lens L6 and the lens L8 may correct various types of aberrations generated by the three positive lenses. In particular, the balance between longitudinal chromatic aberration and lateral chromatic aberration may be kept by the use of a low dispersion glass material for the lens L7 and a somewhat high dispersion glass material for the lens L9. Further, the alternate disposition of the positive and the negative lenses allows, in particular, the generation of high-order spherical aberration to be reduced. The use of the biconvex lenses for the Lens L5 and the lens L7 is advantageous for the correction of spherical aberration. Preferably the lens L6 and the lens L7 are cemented. This allows the generation of various types of aberrations due to lens distance error and influence of eccentricity to be reduced while correcting chromatic aberration.

The variable magnification optical system of the present embodiment is configured to change the magnification by moving the first lens group G1 and the second lens group G2 along the optical axis Z and changing the distance between the groups. That is, as the magnification is changed from the wide angle end to the intermediate region and further to the telephoto end, the first lens group G1 and the second lens group G2 are moved, for example, from the state shown in A of FIG. 1 to the state of B of FIG. 1 and further to the state of C of FIG. 1 so as to draw the trajectories indicated by the solid lines in the drawings. More specifically, in changing the magnification from the wide angle end state to the telephoto end state, the first lens group G1 and the second lens group G2 are moved such that the distance between them is reduced. Movement of each lens group in the manner described above allows each lens group to perform magnification change effectively.

Further, the variable magnification optical system of the present embodiment is of a configuration in which positive lenses (corresponding to lenses L1 and L9) are disposed at the outermost of the entire system and negative lenses (corresponding to Lenses L2 and L8) are disposed at the immediate inner sides thereof with the aperture stop St at the center. This causes the variable magnification optical system to have symmetry with respect to the aperture stop St, whereby off-axis aberrations generated due to asymmetry may be reduced and favorable imaging performance over the entire imaging area may be maintained throughout the entire magnification range.

Further, the variable magnification optical system of the present embodiment is configured to satisfy conditional expressions (1), (2) given below.

$$22 < vdp < 47 \quad (1)$$

$$-5.00 < f2/fw < -1.20 \quad (2)$$

where,
vdp: average Abbe number of the lens L1 which is a positive lens and the lens L4 which is a positive meniscus lens in the first lens group G1 at the d-line,
fw: focal length of the entire system at the wide angle end, and
f2: focal length of the lens L2 which is a negative lens disposed second from the object side in the first lens group G1.

The conditional expression (1) is an expression that defines the range of Abbe numbers of the lens L1 and the lens L4 for favorably maintaining chromatic aberration. If the lens system falls below the lower limit of the conditional expression (1), the Abbe number vdp is reduced more than necessary and the refractive power of each of the positive and negative lenses used for achromatization in the first lens group G1 can be reduced so that it is advantageous for the correction of spherical aberration and field curvature, but the secondary spectrum of chromatic aberration is aggravated and the generation of color bleeding cannot be suppressed. If the lens system exceeds the upper limit of the conditional expression (1), the refractive power of each of the positive and negative lenses used for achromatization in the first lens group G1 is increased and the secondary spectrum is reduced, so that color bleeding can be corrected satisfactorily, but the generation amounts of spherical aberration and field curvature are increased, and axial imaging performance and off-axial imaging performance or imaging performance at the wide angle end and imaging performance at the telephoto end become non-uniform, so that favorable imaging relationship cannot be maintained throughout the entire magnification range.

The conditional expression (2) is an expression that defines the refractive power of the lens L2 which is a negative lens. If the lens system falls below the lower limit of the conditional expression (2), the refractive power of the lens L2 is too weakened and there is no choice but to increase the refractive power of the lens L3 in order to maintain the magnification ratio, and spherical aberration at the telephoto end is over corrected. Further, the back focus of the entire system is reduced and the space between the lens system and the image plane Sim for disposing the optical member GC is insufficient, causing difficulty in mounting the lens system on an imaging apparatus. If the lens system exceeds the upper limit of the conditional expression (2), the refractive power of the lens L2 is too strengthened and distortion at the wide angle end is increased.

Further, the lens system more preferably satisfies a conditional expression (1-1) given below instead of the conditional expression (1). Still further, the lens system more preferably satisfies a conditional expression (2-1) given below instead of the conditional expression (2). Satisfaction of the conditional expressions (1-1) and (2-1) allows the effects obtained by satisfying the conditional expressions (1) and (2) to be further enhanced.

$$24 < vdp < 44 \quad (1-1)$$

$$-4.00 < f2/fw < -2.00 \quad (2-1)$$

The variable magnification optical system of the present embodiment can be a compact and low cost variable magnification optical system by the aforementioned configuration. Further, a variable magnification optical system with high optical performance while having a large aperture ratio may be formed.

Hereinafter, preferable configurations of the variable magnification optical system of the present embodiment will be described.

The variable magnification optical system of the present embodiment preferably satisfies a conditional expression (3) given below with respect to the lens L1.

$$3 < f1/fw < 17 \quad (3)$$

where,
f1: focal length of the lens L1 in the first lens group, and
fw: focal length of the entire system at the wide angle end.

As the lens L1 takes charge of reducing over corrected spherical aberration, longitudinal chromatic aberration, and lateral chromatic aberration due to the diffusion by the negative refractive power of the entire first lens group G1, a careful consideration should be given to the allocation of positive refractive power to the lens L1. This is defined by the conditional expression (3). If the lens system falls below the lower limit of the conditional expression (3), the positive refractive power of the lens L1 is too strengthened and off-axis light beams are difficult to pass through on the wide angle side unless the lens L1 is cemented with the subsequent negative lens on the image side, resulting in that the focal length at the wide angle end is increased and a desired angle of field cannot be maintained. Further, even if the lens L1 is cemented, the balance between spherical aberration and off-axis aberration cannot be kept and satisfactory imaging performance cannot be obtained.

If the lens system exceeds the upper limit of the conditional expression (3), the back focus is increased too long and the overall length of the entire system is excessively increased, whereby downsizing cannot not be achieved. Further, if the lens system exceeds the upper limit of the conditional expression (3), the positive refractive power in the first lens group G1 is too weakened and spherical aberration in the first lens group G1 is over corrected, whereby spherical aberration cannot be reduced to minimum on both the wide angle side and telephoto side. In this case, if spherical aberration is corrected by increasing the distance between the lens L1 and the subsequent negative lens on the image side, the outer diameter of the lens L1 is increased too large and downsizing cannot be achieved. Further, lateral chromatic aberration is under corrected, in particular, on the wide angle side.

The lens system more preferably satisfies a conditional expression (3-1) given below, instead of the conditional expression (3). Satisfaction of the conditional expression (3-1) allows the effects obtained by satisfying the conditional expression (3) to be further enhanced.

$$6 < f1/fw < 14 \quad (3\text{-}1)$$

The variable magnification optical system of the present embodiment preferably satisfies a conditional expression (4) given below.

$$0.3 < f5/fG2 < 1.5 \quad (4),$$

where, f5: focal length of the lens L5 in the second lens group G2, and
fG2: focal length of the second lens group G2.

The conditional expression (4) is an expression that relates to the ratio in focal length between the positive lens L5 in the second lens group G2 and the second lens group G2. As the ray height of the marginal ray of the axial light beam is highest at the lens L5, the lens L5 has a large impact on the specifications and performance of the variable magnification optical system of the present embodiment. If the lens system falls below the lower limit of the conditional expression (4), the refractive power of the lens L5 is too strengthened and the back focus of the entire system is reduced and the space between the lens system and the image plane Sim for disposing the optical member GC is insufficient, thereby causing difficulty in mounting the lens system on an imaging apparatus. In this case, if the excess amount of refractive power of the lens L5 is tried to be compensated by a lens disposed on the image side of the lens L5, the generation amounts of off-axis aberrations, such as field curvature and the like, are increased and favorable imaging performance cannot be maintained over the entire imaging area. If the lens system exceeds the upper limit of the conditional expression (4), the refractive power of the lens L5 is reduced and the refractive power of the positive lens L7 needs to be increased, thereby resulting in difficulty in satisfactorily correcting both longitudinal chromatic aberration, including secondary spectrum, and spherical aberration in the entire system.

Further, the lens system more preferably satisfies a conditional expression (4-1) given below instead of the conditional expression (4). Satisfaction of the conditional expression (4-1) allows the effects obtained by satisfying the conditional expression (4) to be further enhanced.

$$0.6 < f5/fG2 < 1.2 \quad (4\text{-}1)$$

Further, the variable magnification optical system of the present embodiment preferably satisfies conditional expressions (5) to (7) given below.

$$-0.1 < fG2F/fG2B < 0.1 \quad (5)$$

$$-5 < vd8 - vd9 < 10 \quad (6)$$

$$29 < vd9 < 37 \quad (7)$$

where, fG2F: combined focal length of the object side three lenses L5, L6, L7 in the second lens group G2,
fG2B: combined focal length of the image side two lenses L8, L9 in the second lens group G2,
vd8: Abbe number of the second lens L8 from the image side in the second lens group G2 at the d-line, and
vd9: Abbe number of the lens L9 in the second lens group G2 at the d-line.

The conditional expression (5) is an expression that defines the relationship between a front side sub-lens group f2GF formed of the object side three lenses L5, L6, L7 in the second lens group G2 and a back side sub-lens group F2 GB formed of the image side two lenses L8, L9 in the second lens group G2.

If the lens system falls below the lower limit of the conditional expression (5), the positive refractive power of the front side sub-lens group is too weakened and the back focus of the entire system is increased, whereby the overall length of the entire system is increased and downsizing cannot not be achieved. Further, field curvature is over corrected and the performance in an off-axis peripheral region is degraded, which is undesirable. If the lens system exceeds the upper limit of the conditional expression (5), the positive refractive power of the front side sub-lens group is too strengthened and the telescoping of the second lens group G2 progresses and the back focus of the entire system is too shortened, in particular, at the wide angle end, thereby causing difficulty in mounting the lens system on an imaging apparatus. Further, if the lens system exceeds the upper limit of the conditional expression (5), the positive refractive power of the back side sub-lens group is too strengthened and field curvature is under corrected, thereby degrading off-axis performance.

The conditional expressions (6), (7) are expressions for favorably maintaining chromatic aberration, in particular, lateral chromatic aberration, under the condition in which the conditional expression (5) is satisfied. The conditional expression (6) is an expression related to the material of the lenses L8, L9 which form the back side sub-lens group of the second lens group G2. If the Abbe number of the lens L8 is increased greater than that of the lens L9 for chromatic aberration correction, the negative refractive power of the lens L8 becomes stronger than the positive refractive power of the lens L9 and the negative refractive power of the back side sub-lens group of the second lens group G2 is increased, thereby approaching the lower limit of the conditional expression (5). If the Abbe number of the lens L8 becomes smaller than that of the lens L9, the negative refractive power of the lens L8 becomes weaker than the positive refractive power of the lens L9, thereby approaching the upper limit of the conditional expression (5). That is, the lens system cannot satisfy the conditional expression (5) unless the lens system satisfies the conditional expression (6), thereby causing the problems that occur if the conditional expression (5) is not satisfied.

Similarly for the conditional expression (7), if the lens system does not satisfy the conditional expression (7), the lens system cannot satisfy the conditional expression (6), even though chromatic aberration is corrected, thereby causing problems identical to those that occur if the conditional expression (5) is not satisfied. Further, in order to correct chromatic aberration while satisfying the conditional expression (5), the Abbe number vd9 of the lens L9 needs to be within the range of the conditional expression (7). If the lens system does not satisfy the conditional expression (7), any one of the problems of causing difficulty in correcting chromatic aberration, degrading imaging performance, and impairing compactness will occur.

Further, the lens system preferably satisfies conditional expressions (5-1), (6-1), (7-1) given below instead of the conditional expressions (5) to (7). Satisfaction of the conditional expressions (5-1), (6-1), (7-1) allows the effects obtained by satisfying the conditional expressions (5) to (7) to be further enhanced.

$$-0.05 < fG2F/fG2B < 0.05 \quad (5\text{-}1)$$

$$0 < vd8 - vd9 < 5 \quad (6\text{-}1)$$

$$31 < vd9 < 36 \quad (7\text{-}1)$$

Further, in the variable magnification optical system according to the present embodiment, if the most object side positive lens in the first lens group is formed of a positive meniscus lens with a convex surface on the object side, the variable magnification optical system preferably satisfies a conditional expression (8) given below.

$$4 < r1f/fw < 9 \quad (8)$$

where,
r1f: radius of curvature of the object side surface of the lens L1 in the first lens group,
fw: focal length of the entire system at the wide angle end.

The overall length of the lens system can be reduced by using a lens having a convex shape on the object side as the lens L1 in the first lens group G1 and reducing the radius of curvature of the object side surface, but the radius of curvature is regulated by the conditional expression (3). But, the use of a positive meniscus lens with a convex on the object side as the lens L1 allows the overall length of the lens system regulated by the conditional expression (3) to be reduced, as the refractive power of the lens L1 is reduced by the image side concave surface of the lens L1 even the radius of curvature of the object side surface of the lens L1 is reduced. If the lens system falls below the lower limit of the conditional expression (8), the lens system falls below the lower limit of the conditional expression (3) with respect to the lens L1, thereby causing problems identical to those that occur if the lens system falls below the lower limit of the conditional expression (3). If the lens system exceeds the upper limit of the conditional expression (8), the lens system exceeds the upper limit of the conditional expression (3) with respect to the lens L1, thereby causing problems identical to those that occur if the lens system exceeds the upper limit of the conditional expression (3).

[Example Application to Imaging Apparatus]

Figure 13:
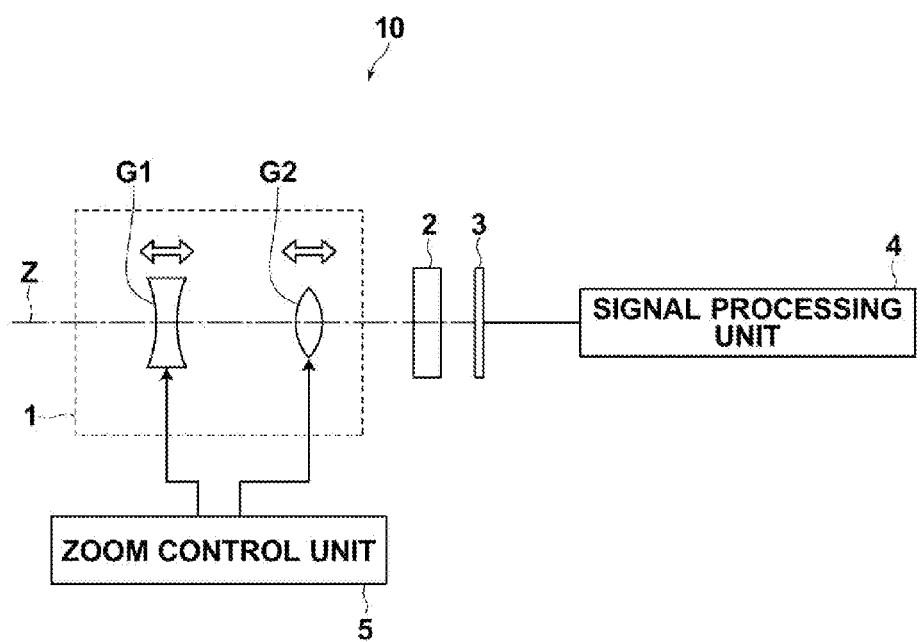
FIG. 13 is a schematic view of the imaging apparatus according to an embodiment of the present invention.

An imaging apparatus according to an embodiment of the present invention will be described. As an example of the imaging apparatus of an embodiment of the present invention, FIG. 13 illustrates a schematic configuration diagram of an imaging apparatus that uses the variable magnification optical system of the embodiment of the present invention. As for the imaging apparatus, for example, a digital camera, a video camera, or a surveillance camera that uses CCD, CMOS, or the like may be cited.

The imaging apparatus 10 illustrated in FIG. 13 includes a variable magnification optical system 1, a filter 2 disposed on the image side of the variable magnification optical system 1, an image sensor 3 that captures a subject image formed by the variable magnification optical system 1, a signal processing unit 4 that performs arithmetic processing on an output signal from the image sensor 3, and a zoom control unit 5 for changing magnification of the variable magnification optical system 1 and performing focus adjustment due to the magnification change.

The variable magnification optical system 1 includes a first lens group G1 having a negative refractive power and performing magnification change by moving along the optical axis Z, an aperture stop St, and a second lens group G2 having a positive refractive power and performing magnification change by moving along the optical axis Z, as in the first lens group G1. In FIG. 13, each lens group is schematically illustrated. The image sensor 3 is a device that converts an optical image formed by the variable magnification optical system 1 to an electrical signal and the imaging surface thereof is disposed so as to correspond to the image plane of the variable magnification optical system 1. As for the image sensor 3, for example, CCD, CMOS or the like may be used.

As the variable magnification optical system 1 in such imaging apparatus, the use of the variable magnification optical system according to the present embodiment allows high resolution imaging signals to be obtained.

EXAMPLES

Specific examples of the variable magnification optical system according to the present embodiment will be described.

Example 1

A, B, C of FIG. 1 illustrate a configuration of a variable magnification optical system according to Example 1 of the present invention. As the detailed description of the lens groups and each lens in the configuration of FIG. 1 is as described above, duplicated description will be omitted hereinafter unless otherwise specifically required.

Tables 1 to 3 show specific lens data corresponding to the configuration of the variable magnification optical system of Example 1 illustrated in FIG. 1. Table 1 shows basic lens data thereof, Table 2 shows other data, and Table 3 shows aspherical surface data. The surface number Si column in the lens data shown in Table 1 indicates $i^{th}$ surface number in which a number i (i=1 to 20) is given to each surface in a serially increasing manner toward the image side with the most object side constituent element surface being taken as the first surface with respect to the variable magnification optical system according to Example 1. The radius curvature Ri column indicates the value (mm) of radius of curvature of $i^{th}$ surface from the object side in association with the symbol Ri given in B of FIG. 1. Similarly, the surface distance Di column indicates the surface distance (mm) on the optical axis Z between $i^{th}$ surface Si and $(i+1)^{th}$ surface Si+1 from the object side. The ndj column indicates the refractive index of $j^{th}$ optical element with respect to the d-line (wavelength of 587.6 nm) in which the number j (j=1, 2, 3, - - - ) is serially increased toward the image side with the most object side optical element being taken as the first optical element, and the vdj column indicates the Abbe number of $j^{th}$ optical element with respect to the d-line. In the lens data of Table 1, the mark "*" attached to the left side of a surface number indicates that the lens surface has an aspherical shape. In the basic lens data of Table 1, values of paraxial radii of curvature are shown as the radii of curvature of these aspherical surfaces.

As the other data, Table 2 shows zoom ratios of the entire system in the infinity focusing state, paraxial focal lengths (mm), back focuses Bf, F-numbers (FNo.), and angles of view (2ω) at the wide angle end, the intermediate region, and the telephoto end.

In the variable magnification optical system according to Example 1, the distance between the first lens group G1 and the second lens group G2 is changed with a change in magnification and, therefore, the distance D8 between the first lens group G1 and the aperture stop St, the distance D9 between the aperture stop St and the second lens group G2, and the distance D18 between the second lens group and the optical member GC are variable. As the data of surface distances D8, D9, and D18 during a magnification change, Table 2 shows zoom spacing (mm) in the infinity focusing state.

Table 3 shows aspherical surface data of the variable magnification optical system according to Example 1. In the numerical values shown as the aspherical surface data, the symbol "E" indicates that the subsequent numerical value is "exponent" to base 10 and the value preceding "E" is multiplied by the value represented by the exponential function to base 10. For example, "1.0E-02" represents "1.0×10$^{-2}$". The aspherical surface coefficients represent values of each of coefficients KA and Am (m=3, 4, 5, - - -, and 16) in an aspherical surface expression given below.

$$Zd = C \cdot h^2 / \{1 + (1 - KA \cdot C^2 \cdot h^2)^{1/2}\} \Sigma Am \cdot h^m$$

where,
Zd: depth of aspheric surface (length of vertical line from a point on the aspheric surface at height h to a flat surface orthogonal to the optical axis to which the aspherical apex contacts),
h: height (distance from the optical axis to lens surface),
C: inverse of paraxial radius of curvature, and
KA, Am: aspherical surface coefficients (m=3, 4, 5, - - -, and 16).

The foregoing explanation of the contents of Tables 1 to 3 also applies to Tables 4 to 9, to be described later.

In all the tables shown below, mm is used as the unit of length and degree (°) is used as the unit of angle, but other appropriate units may also be used, as optical systems can be used by proportionally increasing or decreasing.

Examples 2 and 3

Figure 2:
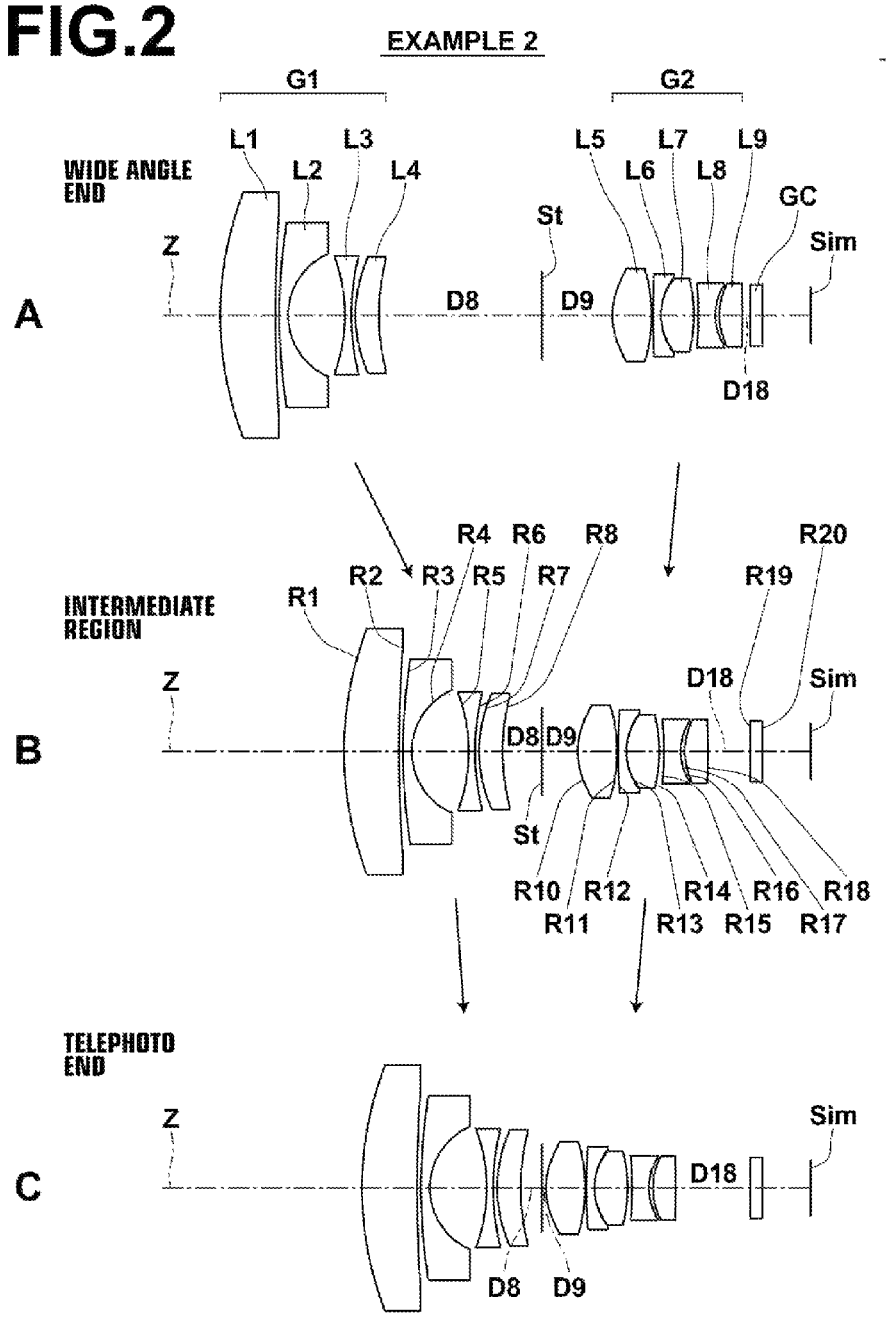
FIG. 2 is a lens cross-sectional view corresponding to Example 2, illustrating a second configuration example of the variable magnification optical system.
Figure 3:
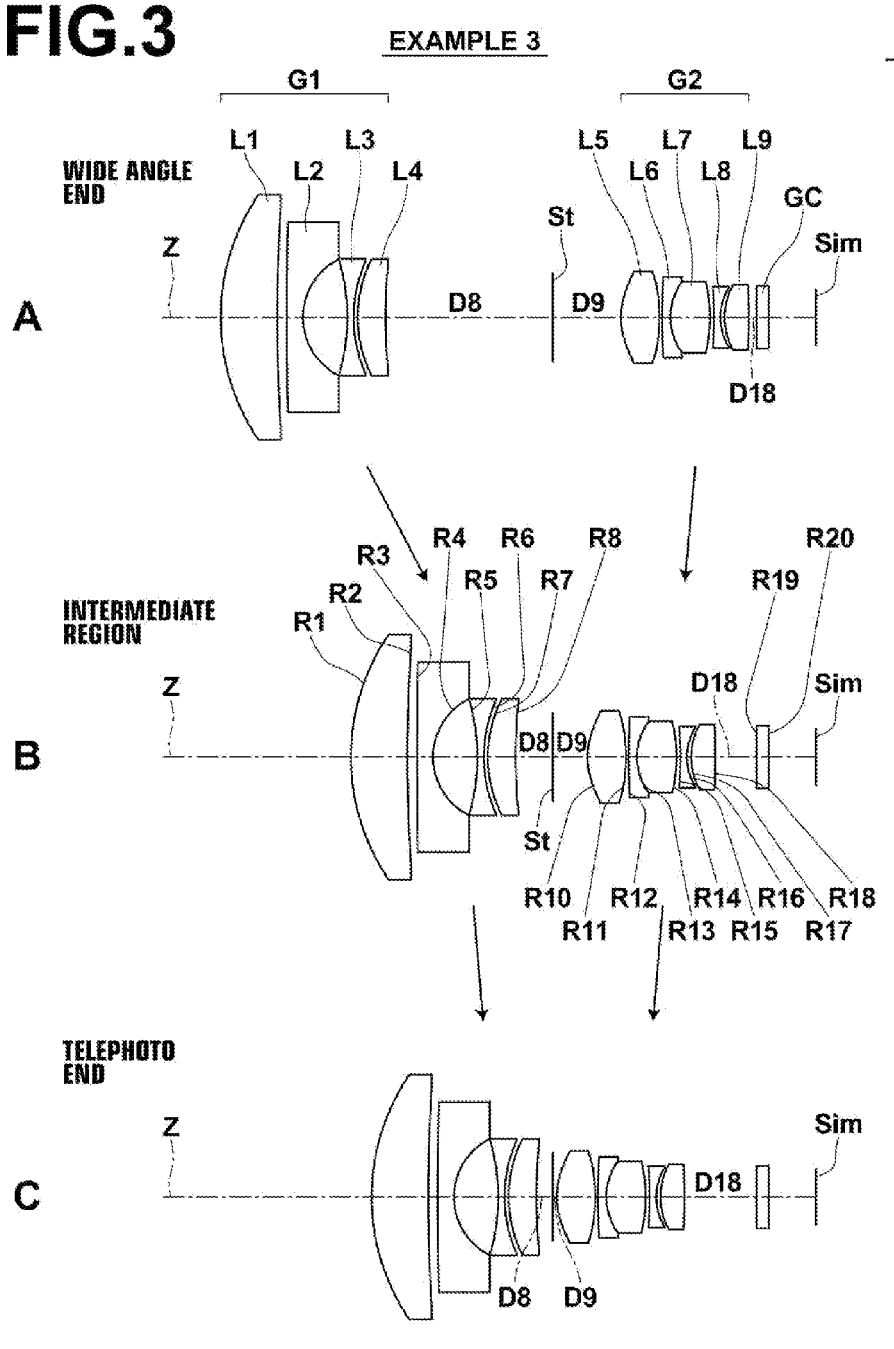
FIG. 3 is a lens cross-sectional view corresponding to Example 3, illustrating a third configuration example of the variable magnification optical system.

A, B, C of FIG. 2 illustrate a configuration of a variable magnification optical system according to Example 2 of the present invention. A, B, C of FIG. 3 illustrate a configuration of a variable magnification optical system according to Example 3 of the present invention. The variable magnification optical systems according to Examples 2 and 3 have configurations substantially identical to that of the variable magnification optical system according to Example 1.

Specific lens data of the variable magnification optical system according to Example 2 are shown in Tables 4 to 6, in the same manner as those of Example 1. Further, specific lens data of the variable magnification optical system according to Example 3 are shown in Tables 7 to 9.

TABLE 1

Example 1·Lens Data

| Si | Ri | Di | ndj | vdj |
|---|---|---|---|---|
| 1 | 28.5819 | 6.12 | 1.77250 | 49.60 |
| 2 | 258.4465 | 1.79 | | |
| 3 | −385.0637 | 1.05 | 1.51742 | 52.43 |
| 4 | 8.6965 | 5.74 | | |
| 5 | −22.3123 | 0.86 | 1.59270 | 35.31 |
| 6 | 22.3123 | 0.77 | | |
| 7 | 17.9934 | 2.80 | 1.95906 | 17.47 |
| 8 | 36.0751 | DD[8] | | |
| 9(Stop) | ∞ | DD[9] | | |
| *10 | 8.6892 | 5.15 | 1.56867 | 58.27 |
| *11 | −19.8167 | 0.15 | | |
| 12 | 75.2262 | 0.80 | 1.73800 | 32.26 |
| 13 | 7.6320 | 3.70 | 1.49700 | 81.54 |
| 14 | −21.8661 | 0.62 | | |
| 15 | −50.5326 | 1.01 | 1.73800 | 32.26 |
| 16 | 7.0025 | 0.58 | | |
| 17 | 8.6989 | 2.95 | 1.90366 | 31.32 |

TABLE 1-continued

Example 1·Lens Data

| Si | Ri | Di | ndj | vdj |
|---|---|---|---|---|
| 18 | −167.1435 | DD[18] | | |
| 19 | ∞ | 1.50 | 1.51633 | 64.14 |
| 20 | ∞ | 6.31 | | |

TABLE 2

Example 1·Other Data

| | Wide Angle End | Intermediate Region | Telephoto End |
|---|---|---|---|
| Zoom Magnification | 1.0 | 2.0 | 2.9 |
| f | 6.09 | 12.19 | 17.80 |
| Bf | 8.30 | 12.49 | 16.35 |
| FNo. | 1.45 | 1.90 | 2.44 |
| 2ω[°] | 67.8 | 32.4 | 22.2 |
| DD[8] | 20.85 | 4.91 | 2.43 |
| DD[9] | 8.55 | 4.36 | 0.50 |
| DD[18] | 1.00 | 5.19 | 9.05 |

TABLE 3

Example 1·Aspherical Surface Coefficient

| Si | 10 | 11 |
|---|---|---|
| KA | 8.31370E−01 | 4.46706E+00 |
| A3 | 1.38442E−04 | 1.40655E−04 |
| A4 | −3.64273E−04 | 1.29995E−04 |
| A5 | 2.14069E−04 | 1.95984E−05 |
| A6 | −1.07462E−04 | 2.97020E−05 |
| A7 | 1.84832E−05 | −3.21623E−05 |
| A8 | 2.90869E−06 | 7.68826E−06 |
| A9 | −2.18967E−06 | 7.36761E−07 |
| A10 | 5.64154E−07 | −4.50691E−07 |
| A11 | −7.38077E−08 | 1.23593E−08 |
| A12 | −1.62232E−09 | 6.97463E−09 |
| A13 | 1.71311E−09 | 6.01839E−10 |
| A14 | −8.19774E−11 | −2.25918E−10 |
| A15 | −1.94415E−11 | 2.34512E−12 |
| A16 | 1.68518E−12 | 1.16817E−12 |

TABLE 4

Example 2·Lens Data

| Si | Ri | Di | ndj | vdj |
|---|---|---|---|---|
| 1 | 43.0180 | 6.83 | 1.80000 | 29.84 |
| 2 | 183.4268 | 0.50 | | |
| 3 | 75.0476 | 1.07 | 1.51742 | 52.43 |
| 4 | 8.4520 | 7.05 | | |
| 5 | −21.3272 | 0.80 | 1.54814 | 45.79 |
| 6 | 30.7474 | 0.51 | | |
| 7 | 17.7103 | 2.90 | 1.92286 | 18.90 |
| 8 | 27.9843 | DD[8] | | |
| 9(Stop) | ∞ | DD[9] | | |
| *10 | 9.0654 | 4.87 | 1.55880 | 62.55 |
| *11 | −19.9157 | 0.15 | | |
| 12 | 73.4929 | 1.01 | 1.72047 | 34.71 |
| 13 | 7.8274 | 4.08 | 1.49700 | 81.54 |
| 14 | −19.3832 | 0.56 | | |
| 15 | −48.0263 | 2.10 | 1.74950 | 35.28 |
| 16 | 7.1675 | 0.50 | | |
| 17 | 8.6169 | 2.84 | 1.91082 | 35.25 |
| 18 | −110.8824 | DD[18] | | |
| 19 | ∞ | 1.50 | 1.51633 | 64.14 |
| 20 | ∞ | 6.00 | | |

TABLE 5

Example 2·Other Data

|  | Wide Angle End | Intermediate Region | Telephoto End |
|---|---|---|---|
| Zoom Magnification | 1.0 | 2.0 | 2.9 |
| f | 5.25 | 10.50 | 15.34 |
| Bf | 7.99 | 12.27 | 16.22 |
| FNo. | 1.45 | 1.91 | 2.49 |
| 2ω[°] | 75.6 | 37.6 | 25.8 |
| DD[8] | 20.22 | 4.88 | 2.65 |
| DD[9] | 8.72 | 4.43 | 0.49 |
| DD[18] | 1.00 | 5.29 | 9.23 |

TABLE 6

Example 2·Aspherical Surface Coefficient

| Si | 10 | 11 |
|---|---|---|
| KA | 8.58524E−01 | 4.50797E+00 |
| A3 | 1.48054E−04 | 9.80812E−05 |
| A4 | −3.69907E−04 | 1.32566E−04 |
| A5 | 2.14169E−04 | 1.92943E−05 |
| A6 | −1.07394E−04 | 2.96288E−05 |
| A7 | 1.84927E−05 | −3.21718E−05 |
| A8 | 2.90926E−06 | 7.68719E−06 |
| A9 | −2.18976E−06 | 7.36663E−07 |
| A10 | 5.64115E−07 | −4.50710E−07 |
| A11 | −7.38294E−08 | 1.23571E−08 |
| A12 | −1.62444E−09 | 6.97422E−09 |
| A13 | 1.71300E−09 | 6.01898E−10 |
| A14 | −8.19890E−11 | −2.25932E−10 |
| A15 | −1.94384E−11 | 2.33735E−12 |
| A16 | 1.68489E−12 | 1.16892E−12 |

TABLE 7

Example 3·Lens Data

| Si | Ri | Di | ndj | vdj |
|---|---|---|---|---|
| 1 | 27.6409 | 7.04 | 1.69680 | 55.53 |
| 2 | 212.7620 | 1.19 |  |  |
| 3 | 519.1309 | 2.00 | 1.51633 | 64.14 |
| 4 | 8.2533 | 5.52 |  |  |
| 5 | −25.7871 | 0.80 | 1.72000 | 50.23 |
| 6 | 17.7553 | 0.50 |  |  |
| 7 | 16.3399 | 3.46 | 1.90366 | 31.32 |
| 8 | 69.9385 | DD[8] |  |  |
| 9(Stop) | ∞ | DD[9] |  |  |
| *10 | 9.4874 | 4.79 | 1.58913 | 61.14 |
| *11 | −19.8761 | 0.32 |  |  |
| 12 | 85.8570 | 1.06 | 1.73800 | 32.26 |
| 13 | 7.7097 | 4.90 | 1.49700 | 81.54 |
| 14 | −19.1130 | 0.50 |  |  |
| 15 | −52.4482 | 0.80 | 1.72047 | 34.71 |
| 16 | 7.1234 | 0.54 |  |  |
| 17 | 8.5809 | 2.98 | 1.85026 | 32.27 |
| 18 | −91.8921 | DD[18] |  |  |
| 19 | ∞ | 1.50 | 1.51633 | 64.14 |
| 20 | ∞ | 5.87 |  |  |

TABLE 8

Example 3·Other Data

|  | Wide Angle End | Intermediate Region | Telephoto End |
|---|---|---|---|
| Zoom Magnification | 1.0 | 2.0 | 2.9 |
| f | 5.90 | 11.80 | 17.23 |
| Bf | 7.86 | 12.03 | 15.86 |
| FNo. | 1.45 | 1.93 | 2.38 |
| 2ω[°] | 69.2 | 33.6 | 23.0 |
| DD[8] | 20.83 | 4.63 | 2.04 |
| DD[9] | 8.49 | 4.33 | 0.49 |
| DD[18] | 1.00 | 5.16 | 9.00 |

TABLE 9

Example 3·Aspherical Surface Coefficient

| Si | 10 | 11 |
|---|---|---|
| KA | 9.12903E−01 | 4.52718E+00 |
| A3 | 1.56144E−04 | 9.31560E−05 |
| A4 | −3.67771E−04 | 1.27067E−04 |
| A5 | 2.14250E−04 | 1.91394E−05 |
| A6 | −1.07333E−04 | 2.96199E−05 |
| A7 | 1.85016E−05 | −3.21698E−05 |
| A8 | 2.90973E−06 | 7.68809E−06 |
| A9 | −2.19005E−06 | 7.36796E−07 |
| A10 | 5.64027E−07 | −4.50673E−07 |
| A11 | −7.38320E−08 | 1.23594E−08 |
| A12 | −1.62383E−09 | 6.97425E−09 |
| A13 | 1.71301E−09 | 6.01222E−10 |
| A14 | −8.19020E−11 | −2.25832E−10 |
| A15 | −1.94400E−11 | 2.34146E−12 |
| A16 | 1.68521E−12 | 1.16898E−12 |

[Other Numerical Data of Each Example]

Table 10 summarizes the values related to each conditional expression described above with respect to each example. As Table 10 shows, the values of each example for the conditional expression (1) to (8) fall within the respective numerical ranges.

TABLE 10

| Expression No. | Conditional Expression | Example 1 | Example 2 | Example 3 |
|---|---|---|---|---|
| (1) | vdp | 33.53 | 24.37 | 43.42 |
| (2) | f2/fw | −2.695 | −3.524 | −2.756 |
| (3) | f1/fw | 6.7 | 13.1 | 7.6 |
| (4) | f5/fG2 | 0.88 | 0.91 | 0.89 |
| (5) | fG2F/fG2B | −0.035 | 0.012 | 0.005 |
| (6) | vd8 − vd9 | 0.94 | 0.03 | 2.44 |
| (7) | vd9 | 31.32 | 35.25 | 32.27 |
| (8) | r1f/fw | 4.69 | 8.191 | 4.684 |

[Aberration Performance]

Figure 4:
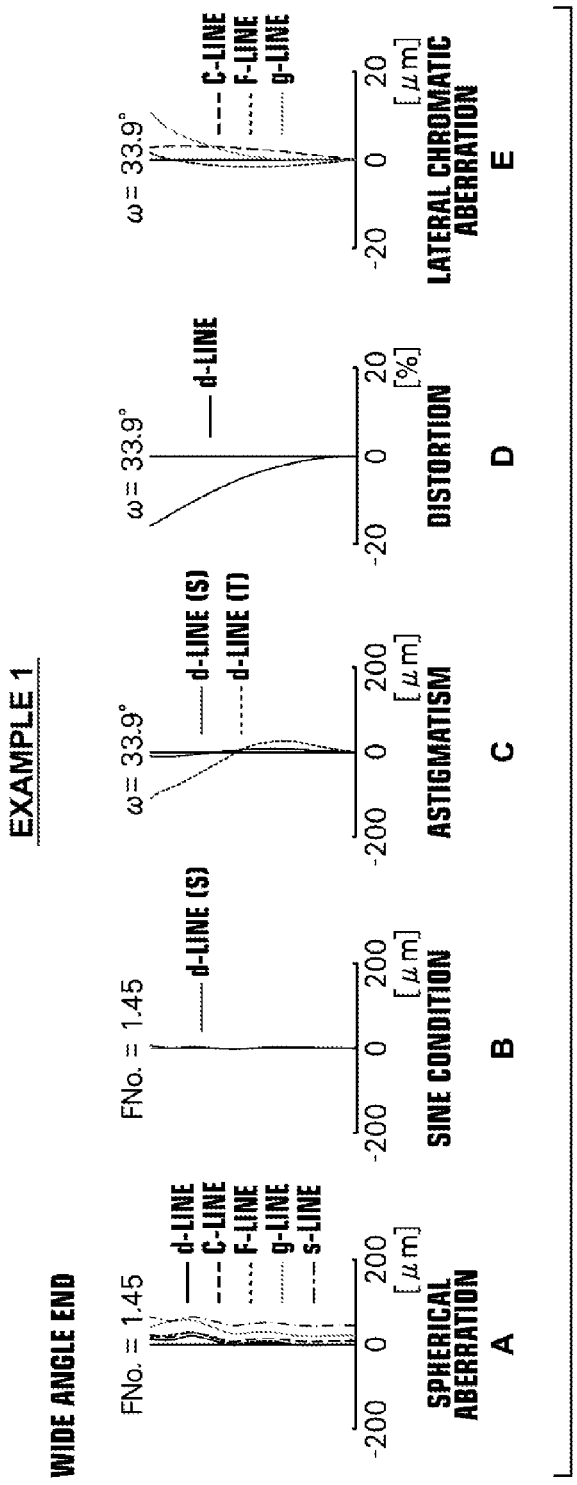
FIG. 4 shows aberration diagrams of the variable magnification optical system according to Example 1 at the wide angle end, in which A is spherical aberration, B is offence against the sine condition, C is astigmatism, D is distortion, and E is lateral chromatic aberration.
Figure 5:
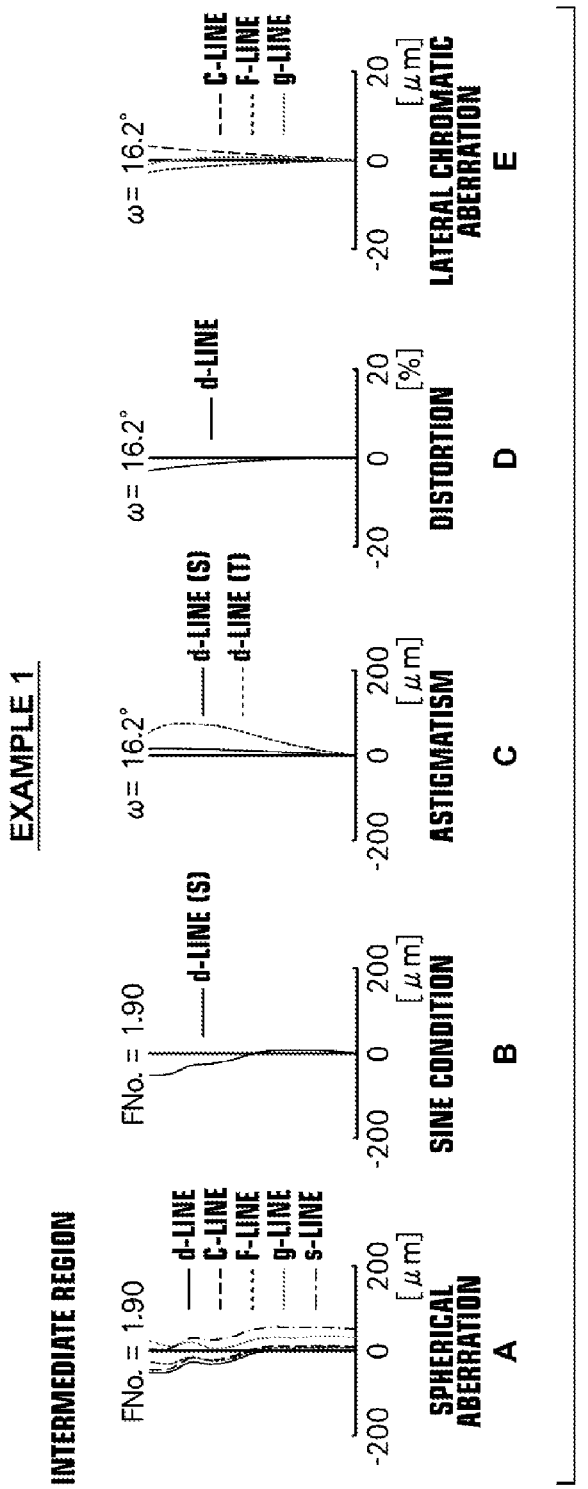
FIG. 5 shows aberration diagrams of the variable magnification optical system according to Example 1 at the intermediate region, in which A is spherical aberration, B is offence against the sine condition, C is astigmatism, D is distortion, and E is lateral chromatic aberration.
Figure 6:
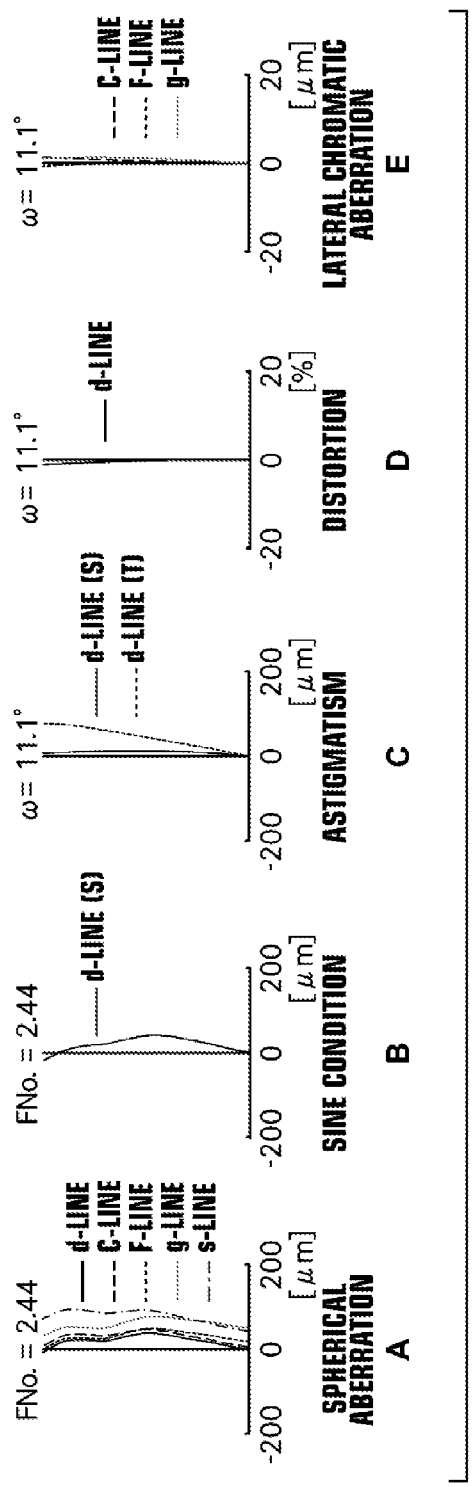
FIG. 6 shows aberration diagrams of the variable magnification optical system according to Example 1 at the telephoto end, in which A is spherical aberration, B is offence against the sine condition, C is astigmatism, D is distortion, and E is lateral chromatic aberration.

A to E of FIG. 4 show spherical aberration, aberration of offence against the sine condition, astigmatism, distortion, and lateral chromatic aberration of the variable magnification optical system according to Example 1 at the wide angle end respectively. A to E of FIG. 5 show similar aberrations at the intermediate region respectively, and A to E of FIG. 6 show similar aberrations at the telephoto end. Each aberration diagram shows aberration with the d-line (587.6 nm) as the reference wavelength. The spherical aberration diagrams also show aberrations with respect to wavelength of 656.3 nm (C-line), wavelength of 486.1 nm (F-line), wavelength of 435.8 nm (g-line), and wavelength of 852.1 nm (s-line). In the astigmatism diagrams, the solid lines represent aberrations in the sagittal direction while the broken lines represent aberrations in the tangential direction. FNo. represents F-number and ω represents half-angle of view. The lateral chromatic aberration diagrams show aberrations with respect to the C-line, the F-line, and the g-line.

Figure 7:
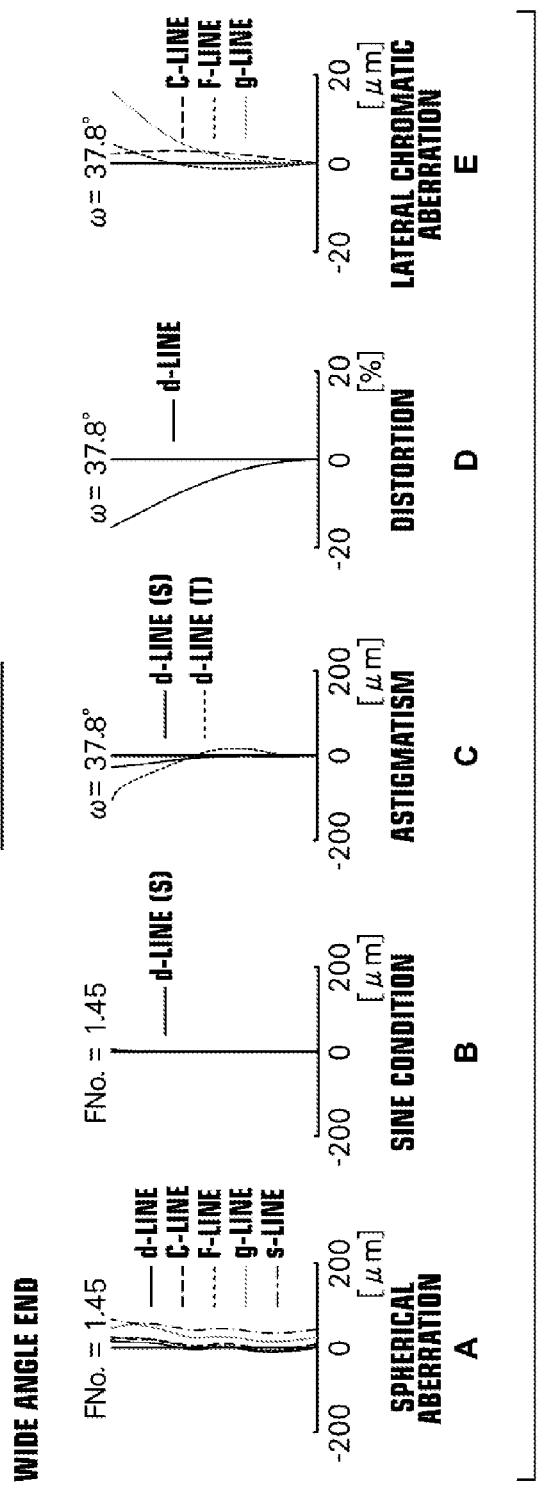
FIG. 7 shows aberration diagrams of the variable magnification optical system according to Example 2 at the wide angle end, in which A is spherical aberration, B is offence against the sine condition, C is astigmatism, D is distortion, and E is lateral chromatic aberration.
Figure 8:
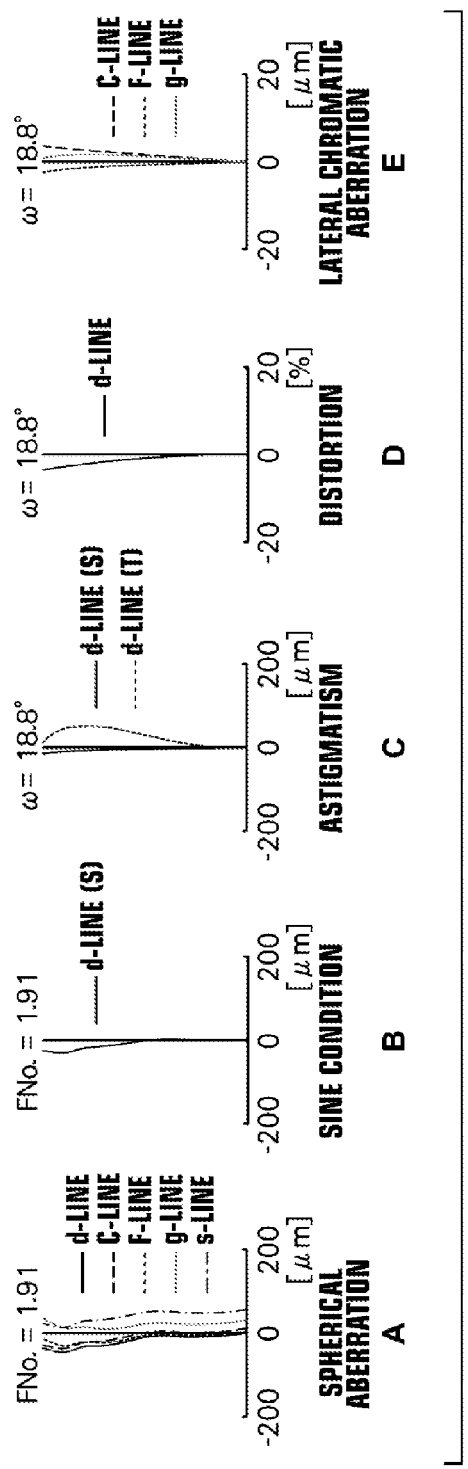
FIG. 8 shows aberration diagrams of the variable magnification optical system according to Example 2 at the intermediate region, in which A is spherical aberration, B is offence against the sine condition, C is astigmatism, D is distortion, and E is lateral chromatic aberration.
Figure 9:
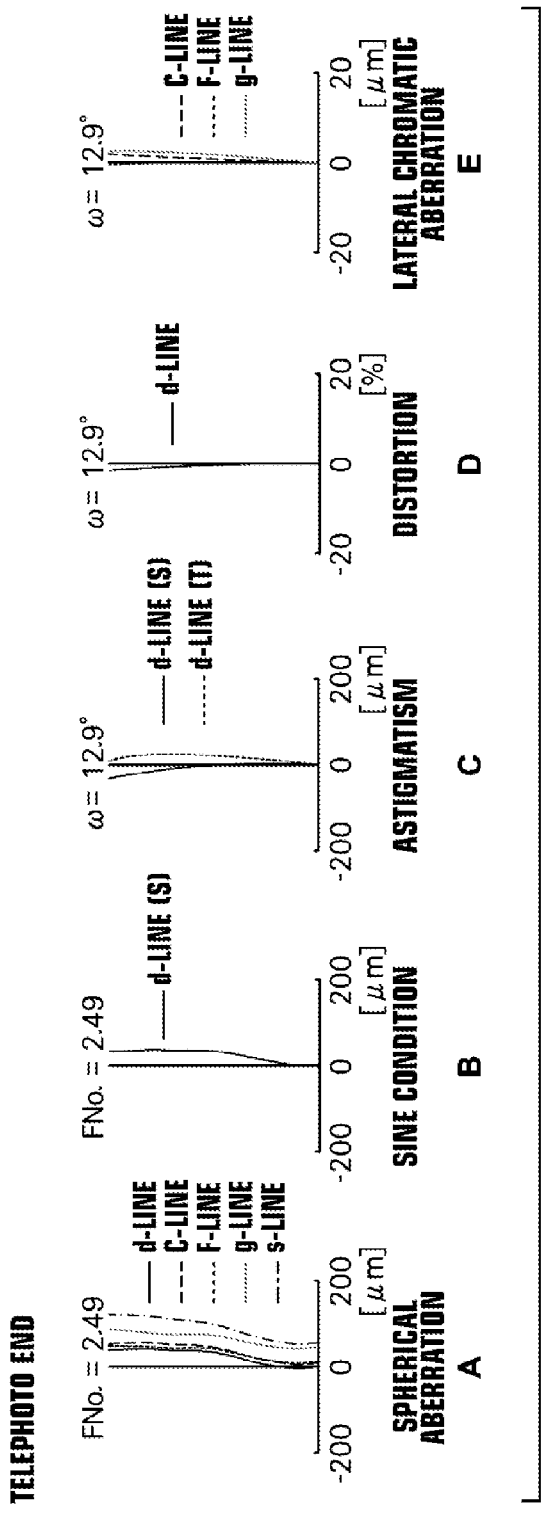
FIG. 9 shows aberration diagrams of the variable magnification optical system according to Example 2 at the telephoto end, in which A is spherical aberration, B is offence against the sine condition, C is astigmatism, D is distortion, and E is lateral chromatic aberration.
Figure 10:
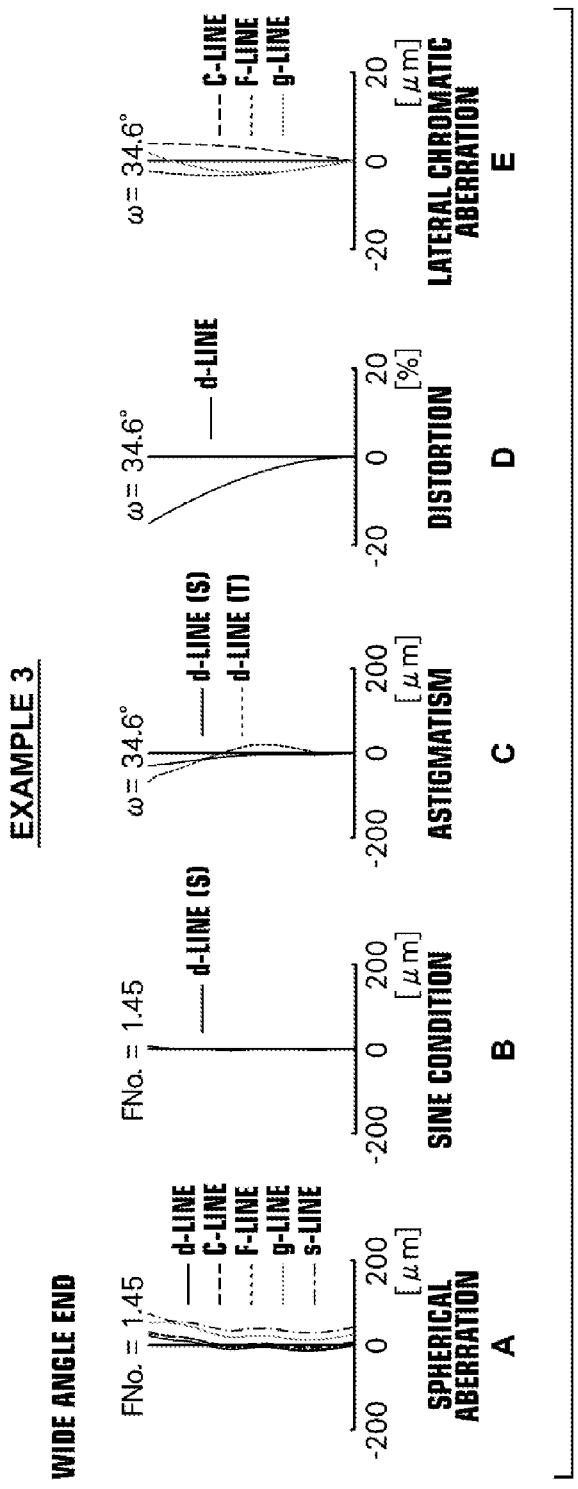
FIG. 10 shows aberration diagrams of the variable magnification optical system according to Example 3 at the wide angle end, in which A is spherical aberration, B is offence against the sine condition, C is astigmatism, D is distortion, and E is lateral chromatic aberration.
Figure 11:
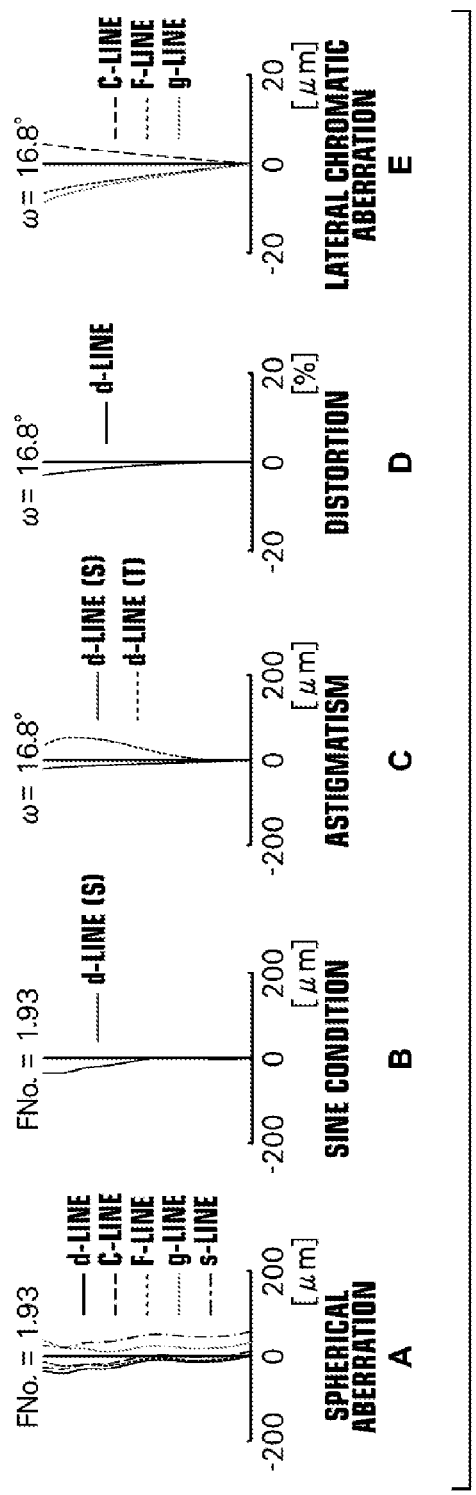
FIG. 11 shows aberration diagrams of the variable magnification optical system according to Example 3 at the intermediate region, in which A is spherical aberration, B is offence against the sine condition, C is astigmatism, D is distortion, and E is lateral chromatic aberration.
Figure 12:
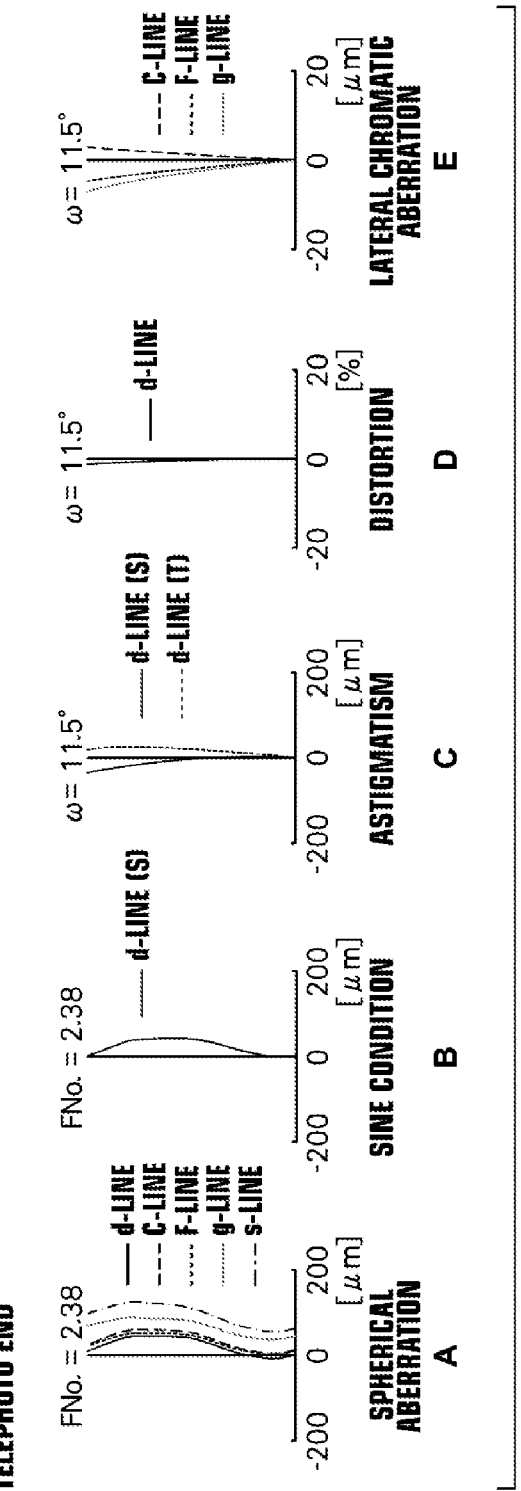
FIG. 12 shows aberration diagrams of the variable magnification optical system according to Example 3 at the telephoto end, in which A is spherical aberration, B is offence against the sine condition, C is astigmatism, D is distortion, and E is lateral chromatic aberration.

Similarly, aberrations of the variable magnification optical system according to Example 2 are shown in A to E of FIG. 7 (wide angle end), A to E of FIG. 8 (intermediate region), and A to E of FIG. 9 (telephoto end). Similarly, aberrations of the variable magnification optical system according to Example 3 are shown in A to E of FIGS. 10 to 12.

As is known from the foregoing numerical data and aberration diagrams, each example realizes a variable magnification optical system which is downsized as a whole and aberrations are satisfactorily corrected.

The present invention is not limited to the foregoing embodiments and each example and various modifications may be made. For example, values of the radius of curvature of each lens element, surface distance, refractive index, and the like are not limited to those illustrated in each numerical example and may take other values.

What is claimed is:

1. A variable magnification optical system, consisting essentially of a first lens group having a negative refractive power, a stop, and a second lens group having a positive refractive power in order from the object side, and being configured such that the distance in an optical axis direction between the first lens group and the second lens group is reduced when magnification is changed from the wide angle end to the telephoto end, wherein:
the stop is fixed with respect to an image plane when magnification is changed;
the first lens group is composed of a positive lens, a negative lens, a negative lens, and a positive meniscus lens with a convex surface on the object side in order from the object side;
the second lens group is composed of a biconvex lens, a negative lens, a biconvex lens, a negative lens, and a positive lens in order from the object side; and
the variable magnification optical system satisfies conditional expressions (1) and (2) given below:

$$22 < vdp < 47 \quad (1)$$

$$-5.00 < f2/fw < -1.20 \quad (2)$$

where,
vdp: average Abbe number of the most object side positive lens and the most image side positive meniscus lens in the first lens group at the d-line,
fw: focal length of the entire system at the wide angle end, and
f2: focal length of the negative lens disposed second from the object side in the first lens group.

2. The variable magnification optical system as claimed in claim 1, wherein the variable magnification optical system satisfies a conditional expression (1-1) given below:

$$24 < vdp < 44 \quad (1-1)$$

where,
vdp: average Abbe number of the most object side positive lens and the most image side positive meniscus lens in the first lens group at the d-line.

3. The variable magnification optical system as claimed in claim 1, wherein the variable magnification optical system satisfies a conditional expression (2-1) given below:

$$-4.00 < f2/fw < -2.00 \quad (2-1)$$

where,
fw: focal length of the entire system at the wide angle end, and
f2: focal length of the negative lens disposed second from the object side in the first lens group.

4. The variable magnification optical system as claimed in claim 1, wherein the variable magnification optical system satisfies a conditional expression (3) given below:

$$3 < f1/fw < 17 \quad (3)$$

where,
f1: focal length of the most object side positive lens in the first lens group, and
fw: focal length of the entire system at the wide angle end.

5. The variable magnification optical system as claimed in claim 1, wherein the variable magnification optical system satisfies a conditional expression (3-1) given below:

$$6 < f1/fw < 14 \quad (3-1)$$

where,
f1: focal length of the most object side positive lens in the first lens group, and
fw: focal length of the entire system at the wide angle end.

6. The variable magnification optical system as claimed in claim 1, wherein the variable magnification optical system satisfies a conditional expression (4) given below:

$$0.3 < f5/fG2 < 1.5 \quad (4)$$

where,
f5: focal length of the most object side biconvex lens in the second lens group, and
fG2: focal length of the second lens group.

7. The variable magnification optical system as claimed in claim 1, wherein the variable magnification optical system satisfies a conditional expression (4-1) given below:

$$0.6 < f5/fG2 < 1.2 \quad (4-1)$$

where,
f5: focal length of the most object side biconvex lens in the second lens group, and
fG2: focal length of the second lens group.

8. The variable magnification optical system as claimed in claim 1, wherein the variable magnification optical system satisfies conditional expressions (5) to (7) given below:

$$-0.1 < fG2F/fG2B < 0.1 \quad (5)$$

$$-5 < vd8 - vd9 < 10 \quad (6)$$

$$29 < vd9 < 37 \quad (7)$$

where,
fG2F: combined focal length of the object side three lenses in the second lens group,
fG2B: combined focal length of the image side two lenses in the second lens group,
vd8: Abbe number of the second negative lens from the image side in the second lens group at the d-line,
vd9: Abbe number of the most image side positive lens in the second lens group at the d-line.

9. The variable magnification optical system as claimed in claim 8, wherein the variable magnification optical system satisfies a conditional expression (5-1) given below:

$$-0.05 < fG2F/fG2B < 0.05 \quad (5-1),$$

where,
fG2F: combined focal length of the object side three lenses in the second lens group, and
fG2B: combined focal length of the image side two lenses in the second lens group.

10. The variable magnification optical system as claimed in claim 8, wherein the variable magnification optical system satisfies a conditional expression (6-1) given below:

$$0<vd8-vd9<5 \qquad (6\text{-}1),$$

where, vd8: Abbe number of the second negative lens from the image side in the second lens group at the d-line, vd9: Abbe number of the most image side positive lens in the second lens group at the d-line.

11. The variable magnification optical system as claimed in claim 8, wherein the variable magnification optical system satisfies a conditional expression (7-1) given below:

$$31<vd9<36 \qquad (7\text{-}1)$$

where, vd9: Abbe number of the most image side positive lens in the second lens group at the d-line.

12. The variable magnification optical system as claimed in claim 1, wherein:

the most object side positive lens in the first lens group is composed of a positive meniscus lens with a convex surface on the object side; and the variable magnification optical system satisfies a conditional expression (8) given below:

$$4<r1f/fw<9 \qquad (8)$$

where, r1f: radius of curvature of the object side surface of the most object side positive lens in the first lens group, and fw: focal length of the entire system at the wide angle end.

13. An imaging apparatus equipped with the variable magnification optical system as claimed in claim 1.

* * * * *

UNITED STATES PATENT AND TRADEMARK OFFICE
CERTIFICATE OF CORRECTION

| | | Page 1 of 1 |
|---|---|---|
| PATENT NO. | : 9,128,275 B2 | |
| APPLICATION NO. | : 14/513416 | |
| DATED | : September 8, 2015 | |
| INVENTOR(S) | : Yasutaka Shimada | |

It is certified that error appears in the above-identified patent and that said Letters Patent is hereby corrected as shown below:

On page 1, left column:

"(73) Assignee: FUJIFILM CORPORATION, Tokyo (JP)"

should be changed to

--(73) Assignee: FUJIFILM Corporation, Tokyo (JP)--

Signed and Sealed this
Fifteenth Day of March, 2016

Michelle K. Lee
*Director of the United States Patent and Trademark Office*